United States Patent
Saad et al.

(10) Patent No.: US 10,527,194 B2
(45) Date of Patent: Jan. 7, 2020

(54) PIPING EQUIPPED WITH A SENSING MEMBER

(71) Applicants: SOCIETE PLYMOUTH FRANCAISE, Feyzin (FR); PLYVAPLAST S.à.r.l., Soleuvre (LU)

(72) Inventors: Mounir Saad, Strasbourg (FR); Patric Michelis, Bettange-sur-Mess (LU)

(73) Assignees: SOCIETE PLYMOUTH FRANCAISE, Feyzin (FR); PLYVAPLAST S.À.R.L., Soleuvre (LU)

( * ) Notice: Subject to any disclaimer, the term of this patent is extended or adjusted under 35 U.S.C. 154(b) by 108 days.

(21) Appl. No.: 15/552,146

(22) PCT Filed: Feb. 12, 2016

(86) PCT No.: PCT/FR2016/050334
§ 371 (c)(1),
(2) Date: Aug. 18, 2017

(87) PCT Pub. No.: WO2016/132053
PCT Pub. Date: Aug. 25, 2016

(65) Prior Publication Data
US 2018/0031145 A1    Feb. 1, 2018

(30) Foreign Application Priority Data
Feb. 20, 2015 (FR) ...................... 15 51466

(51) Int. Cl.
*G01V 3/12* (2006.01)
*F16L 1/11* (2006.01)

(52) U.S. Cl.
CPC . *F16L 1/11* (2013.01); *G01V 3/12* (2013.01)

(58) Field of Classification Search
CPC ..................................... F16L 1/11; G01V 3/12
See application file for complete search history.

(56) References Cited

U.S. PATENT DOCUMENTS 3,543,803 A   12/1970 Chrow
4,368,348 A   1/1983  Eichelberger et al.
(Continued)

FOREIGN PATENT DOCUMENTS

EP   0279344 A2   8/1988
FR   2776135 A1   9/1999
(Continued)

OTHER PUBLICATIONS

English Translation of EP0279344 Abstract.
(Continued)

*Primary Examiner* — Dominic E Hawkins
(74) *Attorney, Agent, or Firm* — Cantor Colburn LLP

(57) ABSTRACT

The invention relates to a pipe (2) including: —a tubular element (3) defining an inner longitudinal passage (5); —a protective element (6) attached onto the outer surface of the tubular element (3) and extending longitudinally in relation to the tubular element (3), the protective element (6) and the tubular element (3) defining a longitudinal receiving passage (9); and —a detection element (12) that is detectable with a detection device. The detection element (12) is linear and includes an electrically conductive core (13) and an electrically insulating sheath (14) that covers the electrically conductive core (13). The detection element (12) extends longitudinally into the receiving passage (9) and is movably mounted longitudinally in relation to the tubular element (3) and the protective element (6).

21 Claims, 2 Drawing Sheets

(56) References Cited

U.S. PATENT DOCUMENTS

| | | | | |
|---|---|---|---|---|
| 8,378,841 B2* | 2/2013 | Stevens | ............... | G06Q 10/08 |
| | | | | 166/250.01 |
| 9,383,427 B2* | 7/2016 | Grimsley | ............... | F16L 1/11 |
| 2003/0231020 A1* | 12/2003 | Yonezawa | ............... | H01Q 1/52 |
| | | | | 324/326 |
| 2006/0177590 A1* | 8/2006 | Abbott | ............... | B05B 12/004 |
| | | | | 427/421.1 |
| 2007/0068286 A1* | 3/2007 | Piper | ............... | G01N 29/225 |
| | | | | 73/866.5 |
| 2007/0201603 A1* | 8/2007 | Sato | ............... | G21C 1/084 |
| | | | | 376/298 |
| 2010/0001741 A1* | 1/2010 | Bier | ............... | G01M 3/165 |
| | | | | 324/600 |
| 2011/0290045 A1* | 12/2011 | Hanko | ............... | G01N 27/333 |
| | | | | 73/866.5 |
| 2013/0323845 A1* | 12/2013 | Kane | ............... | G01N 21/80 |
| | | | | 436/68 |
| 2015/0008252 A1* | 1/2015 | Nakai | ............... | B23K 1/06 |
| | | | | 228/110.1 |

FOREIGN PATENT DOCUMENTS

| | | |
|---|---|---|
| GB | 1213727 A | 11/1970 |
| GB | 2066408 A | 7/1981 |

OTHER PUBLICATIONS

English Translation of GB1213717 Abstract.
International Search Report for Application No. PCT/FR2016/050334.
English Translation of FR2776135 Abstract.
English Translation of GB2066408 Abstract.

* cited by examiner

PIPING EQUIPPED WITH A SENSING MEMBER

CROSS REFERENCE TO RELATED APPLICATIONS

This application is a National Stage of PCT Application No. PCT/FR2016/050334 filed on Feb. 12, 2016, which claims priority to French Patent Application No. 15/51466 filed on Feb. 20, 2015, the contents each of which are incorporated herein by reference thereto.

TECHNICAL FIELD

The present invention concerns a piping equipped with a sensing member, a method for manufacturing such a piping and a method for sensing such a piping.

BACKGROUND

It is important, for saving time and costs but also for safety, to be able to sense the presence of a piping, and in particular a fluid flow piping, and to locate it accurately, without digging into the ground, nor destroying structures, during subsequent works.

Several methods can be used to carry out the sensing of buried piping.

The electromagnetic sensing is the most used method. This electromagnetic sensing may be performed using an electromagnetic sensor comprising in a known manner a transmitter, such as a current generator, and a receiver. In this case, the electromagnetic sensing is carried out on the one hand by injecting, using the transmitter of the electromagnetic sensor, an electrical signal, which produces an electromagnetic field, into an electrically conductive sensing member associated to the piping to be identified and disposed along the path of said piping, through connection housings installed along the piping in order to serve as injection points of the electrical signal, and on the other hand, by capturing using the receiver of the electromagnetic sensor, the electromagnetic field created by the alternating current circulating in the sensing member.

In a manner known per se, the sensing member is covered by a cylindrical sheath made of an electrically insulating material and is fastened on the piping to be identified using fastening means, such as for example, circlips, self-gripping strips, or adhesive strips.

Such fastening means enable, mostly, a displacement of the sensing member on the outer surface of the piping to be identified, and this in particular when the piping is of circular section. These movements of the sensing member may lead to an inaccurate positioning of the sensing member, and therefore to an inaccurate and difficult sensing of the associated piping.

However, taking into account the drastic evolution of the accuracy standards in terms of sensing of buried piping, it is necessary to ensure an optimum positioning of the sensing member, including after burial of the associated piping.

BRIEF SUMMARY

The present invention aims to overcome these drawbacks.
The technical problem underlying the invention therefore consists in providing a piping which is of simple and economical structure, while ensuring an easy and optimal positioning of the sensing member and therefore an easy sensing of the piping.

To this end, the present invention concerns a piping intended to be buried, comprising:
  a tubular member delimiting a longitudinal inner passage,
  a protective strip extending longitudinally relative to the tubular member, the protective strip comprising two longitudinal lateral portions fastened on the outer surface of the tubular member, the protective strip and the tubular member delimiting a longitudinal receiving passage, and
  a sensing member intended to be sensed with a sensing device, the sensing member being linear and comprising an electrically conductive core and an electrically insulating sheath covering the electrically conductive core, the sensing member extending longitudinally in the receiving passage and being movably mounted longitudinally relative to the tubular member and the protective strip, the two longitudinal lateral portions of the protective strip extending on either side of the sensing member.

Such a configuration of the piping, and more particularly the disposition of the sensing member in the longitudinal receiving passage partially delimited by the tubular member, ensures an optimal and stable final positioning of the sensing member along the upper generatrix of the associated piping, including after burial of the associated piping.

Thus, the configuration of the piping according to the present invention ensures an easy and accurate electromagnetic sensing of the piping.

Furthermore, the fact that the sensing member is movably mounted longitudinally in the receiving passage allows avoiding a rupture, and in particular a tearing, of the protective strip when the piping is wound on a crown or a reel. Thereby, the configuration of the piping according to the present invention allows holding the sensing member in place during the unwinding and the laying of the piping in a trench intended to receive said piping.

Furthermore, such mounting of the sensing member allows an easy access to one end portion of the sensing member by tearing one end portion of the protective strip using, for example, a simple tool such as a screwdriver or the like, for the purpose of connecting the sensing member to a sensing member of an adjacent piping, or to a connection member of a sensing terminal.

The configuration of the piping according to the present invention, and in particular the fact that it is pre-equipped with the sensing member, allows on the one hand reducing the costs and the time of laying, and on the other hand facilitating the laying thereof in particular in a narrow trench, and also using a trencher. These dispositions further allow ensuring an easy laying of the piping in sinking and in directional drilling.

In the present patent application, the term «piping» means any pipe, tube and sheath intended for the long-distance transport or the distribution of a liquid, gas, electricity, or light, or an empty sheath placed ready for further use.

According to an embodiment of the invention, the longitudinal inner passage is intended for the flow of a fluid, or for the passage of at least one optical fiber and/or at least one electrical cable.

According to an embodiment of the invention, the tubular member is flexible.

The piping may further have one or more of the following feature(s), taken alone or in combination.

According to an embodiment of the invention, the sensing member extends along the upper generatrix of the tubular member.

According to an embodiment of the invention, the longitudinal receiving passage extends substantially over the entire length of the tubular member.

According to an embodiment of the invention, the longitudinal receiving passage includes a first and a second passage openings disposed respectively substantially at the first and second ends of the tubular member.

According to an embodiment of the invention, the sensing member has a cross-section smaller than the cross-section of the receiving passage.

According to an embodiment of the invention, the two longitudinal lateral portions of the protective strip are each fastened on the outer surface of the tubular member by ultrasonic welding.

According to an embodiment of the invention, the protective strip is made of a synthetic material, and for example of a polymeric material. The protective strip might be made of a non-woven synthetic material comprising polyethylene fibers, such as high-density polyethylene fibers, and for example of Tyvek (registered trademark). The protective strip might be also made of polypropylene.

According to an embodiment of the invention, the sensing member is an electrically conductive wire.

According to an embodiment of the invention, the tubular member includes a tubular wall delimiting the longitudinal inner passage, the two lateral portions of the protective strip being fastened on the outer surface of the tubular wall. For example, the tubular wall of the tubular member may be ringed or have a smooth outer surface.

According to an embodiment of the invention, the electrically insulating sheath is made of polyethylene or polypropylene.

According to an embodiment of the invention, the sensing member has a rectangular, oval or circular section.

According to an embodiment of the invention, the tubular member is made of polyethylene.

The present invention further concerns an installation comprising:
  at least one piping according to the invention, and
  at least one connection housing including at least one connection member electrically connected to the sensing member of the at least one piping.

According to an embodiment of the invention, the installation includes at least one sensing terminal including the at least one connection housing. The sensing terminal may be, for example, in accordance with those described in the documents FR2982889, FR3006061 and FR2997195. The sensing terminal may be, for example, a curb box.

According to an embodiment of the invention, the sensing terminal includes an electrically conductive portion electrically connected to the connection member and accessible from the outside of a structure on which the sensing terminal is fastened. The term «structure» in particular means a sidewalk, a pavement, a brick wall, an access hatch to a technical gallery, a manhole cover or a manhole.

According to an embodiment of the invention, the piping is a fluid flow piping or a protective piping for optical fiber and/or electrical cable, or else for a fluid flow conduit.

The present invention also concerns a method for manufacturing a piping according to the invention, comprising the steps consisting in:
  extruding the tubular member,
  laying the sensing member longitudinally on the outer surface of the tubular member,
  laying the protective strip longitudinally on the outer surface of the tubular member so as to cover the sensing member, and
  fastening the longitudinal lateral portions of the protective strip on the outer surface of the tubular member so as to form the longitudinal receiving passage.

According to an embodiment of the manufacturing method, said manufacturing method comprises a step of cooling the tubular member carried out between the step of extruding the tubular member and the step of laying the sensing member.

According to an embodiment of the manufacturing method, the step of laying the protective strip is carried out continuously.

According to an embodiment of the manufacturing method, the step of fastening the protective strip is carried out continuously.

According to an embodiment of the manufacturing method, the step of fastening the protective strip is carried out at the end of the manufacturing cycle of the tubular member. Advantageously, the laying steps are also carried out at the end of the manufacturing cycle of the tubular member.

According to an embodiment of the manufacturing method, the step of laying the sensing member comprises a step consisting in unwinding the sensing member from a sensing member coil.

According to an embodiment of the manufacturing method, the step of laying the protective strip comprises a step consisting in unwinding the protective strip from a protective strip coil.

According to an embodiment of the manufacturing method, the step of laying the protective strip consists in laying the longitudinal lateral portions of the protective strip on either side of the sensing member.

According to an embodiment of the manufacturing method, said manufacturing method comprises a step consisting in displacing the tubular member longitudinally, that is to say parallel to the direction of extension thereof, and for example along the extrusion direction thereof, during the steps of laying the sensing member and the protective strip and during the step of fastening the protective strip.

According to an embodiment of the manufacturing method, the fastening step consists in fastening the longitudinal lateral portions of the protective strip on the outer surface of the tubular member by ultrasonic welding.

According to an embodiment of the manufacturing method, the fastening step is carried out using a sonotrode.

According to an embodiment of the manufacturing method, the sonotrode has a resonance frequency comprised between 20 kHz and 70 kHz, and for example of 20, 30, 35, 40 or 70 kHz.

According to an embodiment of the manufacturing method, the sonotrode has a vibration amplitude comprised between 10 and 120 micrometers.

Furthermore, the present invention concerns a method for sensing a buried piping according to the invention, comprising the steps consisting in:
  injecting an electrical signal into the sensing member,
  sensing the electromagnetic field generated by the sensing member.

The injection step is advantageously carried out using an electrical signal generator, such as a current generator. According to an embodiment of the sensing method, the injection step comprises a step consisting in electrically connecting the electrical signal generator to the sensing member, and for example, electrically connecting the electrical signal generator to an electrically conductive portion of a sensing terminal, said electrically conductive portion being electrically connected to the sensing member and being accessible from outside a structure on which the sensing terminal is fastened.

The sensing step is advantageously carried out using an electromagnetic sensor.

BRIEF DESCRIPTION OF THE DRAWINGS

In any case, the invention will be well understood using the following description with reference to the appended schematic drawing representing, by way of non-limiting example, an embodiment of this piping.

DETAILED DESCRIPTION

Figure 1:
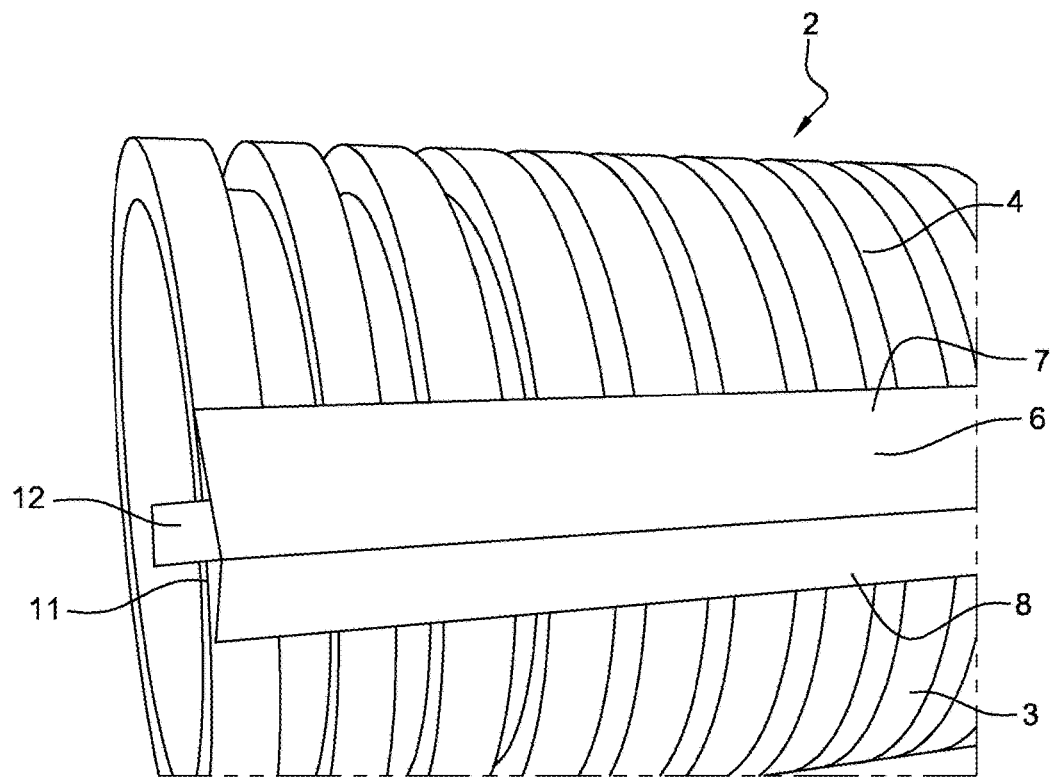
FIG. 1 is a partial perspective view of a piping according to the invention.
Figure 2:
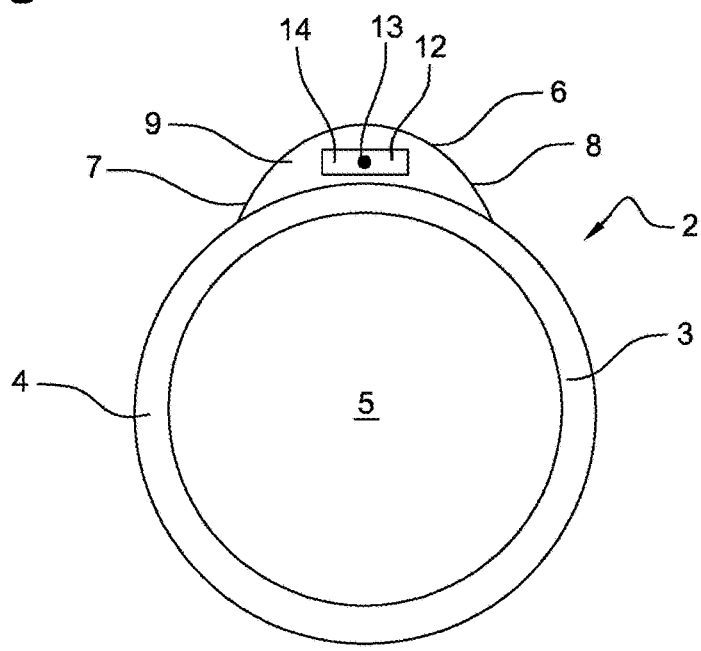
FIG. 2 is a cross-sectional view of the piping of FIG. 1.
Figure 3:
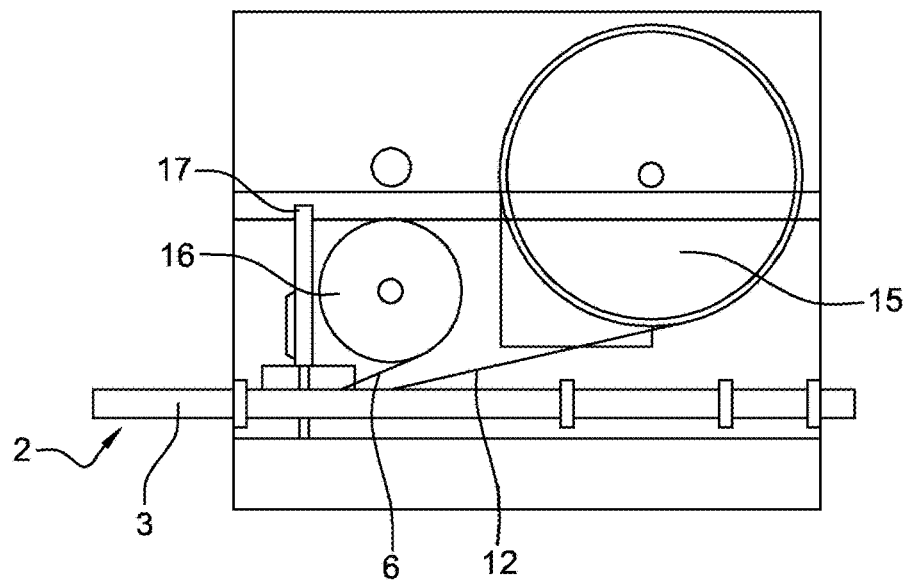
FIG. 3 is a schematic view of the piping of FIG. 1 during manufacture.
Figure 4:
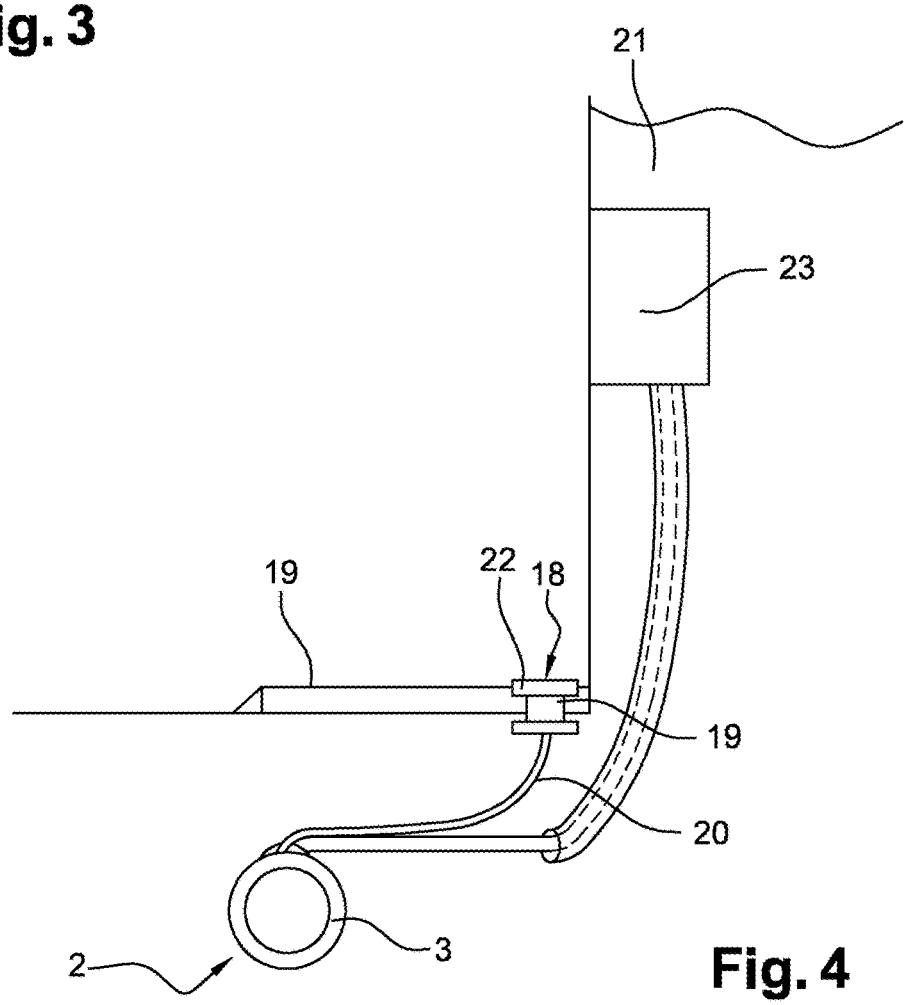
FIG. 4 is a schematic view of an installation comprising a piping according to FIG. 1 and a sensing terminal.

FIGS. 1 and 2 show a piping 2 intended to be buried. The piping 2 may be for example a fluid flow piping or else a protective piping for an optical fiber and/or an electrical cable.

The piping 2 comprises a tubular member 3 including a tubular wall 4 delimiting a longitudinal inner passage 5 intended for example for the flow of a fluid, such as a gas or water, and for example rain water, waste water, potable water, or intended for the passage of at least one optical fiber and/or at least one electrical cable. For example, the tubular wall 4 may be ringed or have a smooth outer surface. Furthermore, the tubular member 3 may be made for example of polyethylene.

The piping 2 further comprises a protective member 6, made in the shape of a protective strip, fastened on the outer surface of the tubular member 3. The protective member 6 extends longitudinally along the upper generatrix of the tubular member 3. The protective member 6 comprises more particularly two longitudinal lateral portions 7, 8 fastened on the outer surface of the tubular member 3 by ultrasonic welding. The protective member 6 is advantageously made of a synthetic material, and more particularly of a polymeric material. The protective member 6 may be made of a non-woven synthetic material comprising polyethylene fibers, such as high-density polyethylene fibers, and for example of Tyvek (registered trademark). However, the protective member 6 might be also made of another polymeric material, such as of polypropylene. The protective member 6 may have for example a width comprised between 3 and 4 cm.

The protective member 6 and the tubular member 3 delimit a longitudinal receiving passage 9 extending over the entire length of the tubular member 3. The longitudinal receiving passage 9 includes a first and a second passage openings 11 disposed respectively at the first and second ends of the tubular member 3.

The piping 2 also comprises a sensing member 12, made in the shape of an electrically conductive wire, adapted to be sensed with a sensing device, such as an electromagnetic sensor. The sensing member 12 extends longitudinally in the receiving passage 9 and is movably mounted longitudinally relative to the tubular member 3 and to the protective member 6. The two longitudinal lateral portions 7, 8 of the protective member 6 advantageously extend on either side of the sensing member 12. According to an embodiment of the invention, the sensing member 12 has a cross-section smaller than the cross-section of the receiving passage 9.

The sensing member 12 may have a rectangular, oval or even circular cross-section. The sensing member 12 advantageously comprises an electrically conductive core 13 and an electrically insulating sheath 14 covering the electrically conductive core 13. The electrically conductive core 13 may be for example made of copper, stainless steel or another metal, and the electrically insulating sheath 14 may be for example made of polyethylene or polypropylene.

A method for manufacturing a piping 2 according to the invention will now be described. Such a method comprises the following steps consisting in:
   extruding the tubular member 3,
   cooling the tubular member 3,
   displacing the tubular member 3 longitudinally,
   laying the sensing member 12 longitudinally on the outer surface of the tubular member 3,
   laying the protective strip 6 longitudinally on the outer surface of the tubular member 3 so as to cover the sensing member 12 and such that the longitudinal lateral portions 7, 8 of the protective member 6 extend on either side of the sensing member 12, and
   fastening the longitudinal lateral portions 7,8 of the protective member 6 on the outer surface of the tubular member 3 by ultrasonic welding so as to form the longitudinal receiving passage 9.

According to an embodiment of the manufacturing method, the steps of displacing the tubular member 3 and laying the sensing member 12 and the protective member 6 are carried out continuously.

According to an embodiment of the manufacturing method, the fastening step and the laying steps are carried out at the end of the manufacturing cycle of the tubular member 3.

According to an embodiment of the manufacturing method, the step of laying the sensing member 12 comprises a step consisting in unwinding the sensing member 12 from a sensing member coil 15, and the step of laying the protective member 6 comprises a step consisting in unwinding the protective member from a protective member coil 16.

According to an embodiment of the manufacturing method, the step of fastening the protective member 6 is carried out continuously.

According to an embodiment of the manufacturing method, the fastening step is carried out using a sonotrode 17. The sonotrode 17 may have a resonance frequency comprised between 20 kHz and 70 kHz, and for example of 20, 30, 35, 40 or 70 kHz, and a vibration amplitude comprised between 10 and 120 micrometers.

According to an embodiment of the manufacturing method, the sensing member coil 15 and the protective member coil 16 have winding axes perpendicular to the displacement direction of the tubular member 3.

A method for sensing a piping 2 according to the invention will now be described. Such a method comprises the following steps consisting in:
   providing a sensing terminal 18 comprising a connection housing 19 equipped with at least one connection member,
   baring one of the ends of the sensing member 12 belonging to the piping 2,
   electrically connecting the bared end of the sensing member 12 to the connection member of the sensing terminal 18, for example using an electrical cable portion 20,
   fastening the sensing terminal 18 on a structure, such as a sidewalk 24 or a wall 21, electrically connecting an electrical signal generator, such as a current generator, to the connection member of the sensing terminal 18, injecting an electrical signal into the sensing member 12, in particular via the connection member, using the electrical signal generator, and sensing the electromagnetic field generated by the sensing member 12 using an electromagnetic sensor so as to sense and follow the piping 2.

According to an embodiment of the sensing method, the sensing terminal 12 comprises an electrically conductive portion 22 electrically connected to the sensing member, and the step of fastening the sensing terminal 18 is carried out such that the electrically conductive portion 22 is accessible from the outside of the structure.

According to an embodiment of the sensing method, the injection step comprises a step consisting in electrically connecting the electrical signal generator to the electrically conductive portion 22 of the sensing terminal.

According to another embodiment of the sensing method, the fastening step consists in fastening the sensing terminal 18 in the vicinity of a cabinet of gas meter 23, of water meters or any other flush.

According to a variant of the sensing method, the bared end of the sensing member 12 might be electrically connected to a cabinet placed in an inspection manhole, and the electrical signal might be then injected into the sensing member 12 via the cabinet.

According to yet another variant of the sensing method, the bared end of the sensing member 12 might be left pending and the electrical signal might be then directly injected into the sensing member 12 from the bared end thereof.

Of course, the invention is not limited to the only embodiment of this piping 2, described above by way of example, on the contrary it embraces all the variants thereof.

The invention claimed is:

1. A piping configured to be buried, comprising:
a tubular member delimiting a longitudinal inner passage,
a flexible protective strip extending longitudinally relative to the tubular member, the flexible protective strip comprising two longitudinal lateral portions fastened on an outer surface of the tubular member, the flexible protective strip and the tubular member delimiting a longitudinal receiving passage, and
a sensing member configured to be sensed with a sensing device, the sensing member being linear and comprising an electrically conductive core and an electrically insulating tubular sheath covering and surrounding the electrically conductive core, the sensing member extending longitudinally in the longitudinal receiving passage delimited by the flexible protective strip and the tubular member, the sensing member being longitudinally displaceable in the longitudinal receiving passage and being movably mounted longitudinally relative to the tubular member and the flexible protective strip, the two longitudinal lateral portions of the flexible protective strip extending on either side of the sensing member.

2. The piping according to claim 1, wherein the sensing member has a cross-section smaller than a cross-section of the longitudinal receiving passage.

3. The piping according to claim 1, wherein the two longitudinal lateral portions of the flexible protective strip are each fastened on the outer surface of the tubular member by ultrasonic welding.

4. The piping according to claim 1, wherein the flexible protective strip is made of a synthetic material.

5. The piping according to claim 4, wherein the flexible protective strip is made of a non-woven synthetic material comprising polyethylene fibers.

6. The piping according to claim 1, wherein the flexible protective strip is made of Tyvek.

7. The piping according to claim 1, further comprising:
at least one connection housing including at least one connection member electrically connected to the sensing member of the at least one piping.

8. A method for manufacturing a piping according to claim 1, comprising the steps consisting in:
extruding the tubular member,
laying the sensing member longitudinally on the outer surface of the tubular member,
laying the flexible protective strip longitudinally on the outer surface of the tubular member and on the sensing member so as to cover the sensing member, and
fastening the two longitudinal lateral portions of the flexible protective strip on the outer surface of the tubular member so as to form the longitudinal receiving passage.

9. The manufacturing method according to claim 8, wherein the fastening step consists in fastening the two longitudinal lateral portions of the flexible protective strip on the outer surface of the tubular member by ultrasonic welding.

10. A method for sensing a piping according to claim 1, comprising the steps consisting in:
injecting an electrical signal into the sensing member,
sensing the electromagnetic field generated by the sensing member.

11. The piping according to claim 2, wherein the two longitudinal lateral portions of the flexible protective strip are each fastened on the outer surface of the tubular member by ultrasonic welding.

12. The piping according to claim 4, wherein the synthetic material is a polymeric material.

13. The piping according to claim 11, wherein the flexible protective strip is made of a synthetic material.

14. The piping according to claim 2, wherein the flexible protective strip is made of a synthetic material.

15. The piping according to claim 3, wherein the flexible protective strip is made of a synthetic material.

16. The piping according to claim 5, wherein the polyethylene fibers of the non-woven synthetic material are high-density polyethylene fibers.

17. The piping according to claim 11, wherein the flexible protective strip is made of a non-woven synthetic material comprising polyethylene fibers.

18. The piping according to claim 13, wherein the flexible protective strip is made of a non-woven synthetic material comprising polyethylene fibers.

19. The piping according to claim 11, further comprising:
at least one connection housing including at least one connection member electrically connected to the sensing member of the at least one piping.

20. The piping according to claim 13, further comprising:
at least one connection housing including at least one connection member electrically connected to the sensing member of the at least one piping.

21. The piping according to claim 1, wherein the longitudinal receiving passage extends over the entire length of the tubular member.

* * * * *